C. F. STARLIPER.
SHAFT COLLAR.
APPLICATION FILED JULY 25, 1914.
1,151,131.
Patented Aug. 24, 1915.
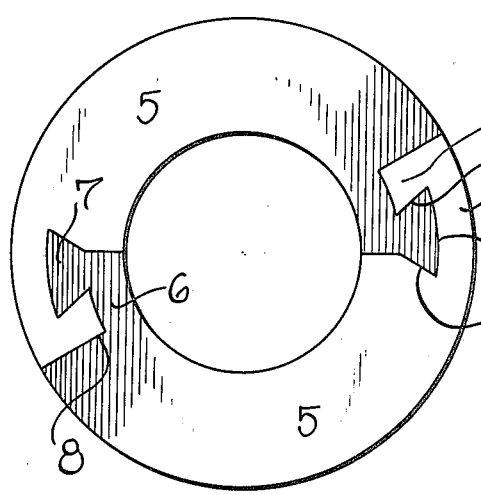
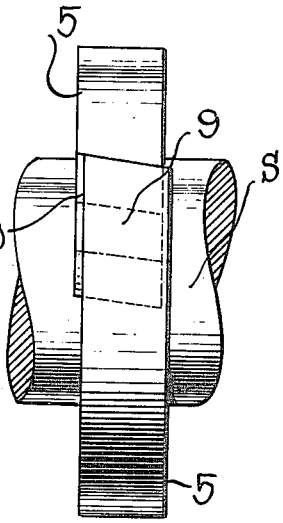
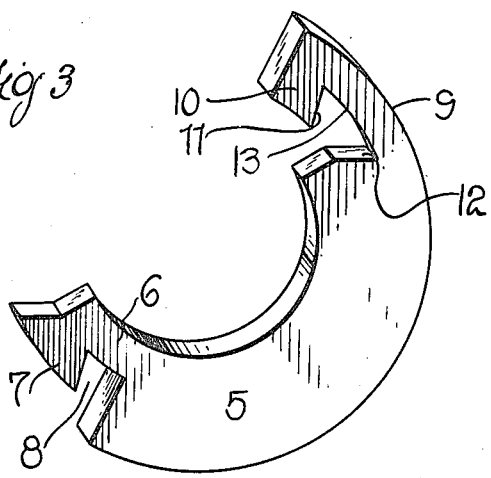
Witnesses
Robert M. Sutphen
A. I. Hind
Inventor
C. F. Starliper
By Watson E. Coleman
Attorney

UNITED STATES PATENT OFFICE.

CHRISTOPHER F. STARLIPER, OF HAMPTON, TENNESSEE.

SHAFT-COLLAR.

1,151,131.  Specification of Letters Patent.  Patented Aug. 24, 1915.

Application filed July 25, 1914. Serial No. 853,100.

*To all whom it may concern:*

Be it known that I, CHRISTOPHER F. STARLIPER, a citizen of the United States, residing at Hampton, in the county of Carter and State of Tennessee, have invented certain new and useful Improvements in Shaft-Collars, of which the following is a specification, reference being had to the accompanying drawing.

This invention relates to an improved shaft collar and has for its primary object to provide a sectional stop collar for shafts which may be very easily, quickly and securely applied to the shaft.

The invention has for a further object to provide a collar having two complementary sections, the ends of which are formed for interlocking engagement and are adapted to draw the collar sections into frictional binding engagement with the periphery of the shaft.

The invention has for a further general object to provide a collar of the above character which is simple in its construction, strong, durable and serviceable in practical use and capable of manufacture at a comparatively small cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is a side elevation of my improved collar showing the two sections thereof interlocked; Fig. 2 is an edge view of the collar applied to the shaft; and Fig. 3 is a detail perspective view of one of the collar sections.

Referring in detail to the drawing, 5 designates the collar sections which are identical in construction and are preferably formed of steel or other suitable metal. One end of each collar section is provided with a relatively narrow extension 6 projecting circumferentially from the inner edge thereof. Upon the outer face of this extension at its extremity the dove-tail locking tongue 7 is formed. The inner inclined edge of this tongue in conjunction with the opposed end edge of the collar section outwardly of the extension 6 produces a recess 8. The end edges of the collar and its extension 6 as well as of the tongue 7 are beveled, as clearly shown in Figs. 2 and 3 of the drawing. The opposite end of each collar section is also provided with a narrow circumferential extension 9 at its outer edge, upon the extremity of which the inwardly projecting lug 10 is formed. The inner edge of this tongue is inclined, as at 11, and in conjunction with the reversely inclined end face 12 of the collar and the extension 9 forms the recess 13 which is designed to receive the dove-tail locking tongue 7 of the other collar section. The end edges of the extension 9, lug 10 and the collar section 5 are beveled in a similar manner to the faces on the opposite end of the collar section so that when the collar sections are connected in the manner to be later described, the beveled end faces of one section will properly engage the beveled faces of the other section.

The diameter of the bore or opening formed by the two collar sections when they are completely assembled, is slightly less than the diameter of the shaft to which the collar is to be applied. In applying the collar, one of the sections 5 is arranged upon the shaft indicated at S in Fig. 2, and the other section then moved longitudinally of the shaft and the tongue 7 and lug 10 thereof engaged in the sockets or recesses in the ends of the first named section which are designed to receive the same. As the beveled end faces of one collar section ride upon the correspondingly beveled faces of the other section, the two collar sections are drawn together into frictional clamping engagement upon the periphery of the shaft. When first applied, one of the collar sections will project a slight distance beyond the face of the other collar section, as clearly indicated in Fig. 2 of the drawing. As the inner walls of the collar sections become worn, said sections are driven more tightly together so as to compensate for such wear until the two sections are disposed in the same plane about the shaft to which they are applied.

From the foregoing description, taken in connection with the accompanying drawing, the construction, manner of operation and several advantages of my invention will be clearly and fully understood. My improved sectional collar may be very easily and quickly applied to the shaft or removed therefrom and by constructing the collar sections in the manner above explained, they will retain a tight clamping engagement upon the shaft so that supplemental holding means for the collar may be dispensed with. My invention may also be manufactured at a small cost and is extremely durable as well as highly serviceable and convenient in practical use.

I claim:

1. A shaft collar including two complementary sections, each section being formed at its ends with a radially extending dove-tail projection and a radially extending dove-tail recess inward of the projection, said recesses and projections on one section interlocking and mating with the projections and recesses on the other section.

2. A shaft collar including two complementary sections, each section being formed at its ends with a radially extending dove-tail projection and a radially extending dove-tail recess inward of the projection, said recesses and projection on one section interlocking and mating with the projection and recesses on the other section, the under faces of said projections and recesses being laterally inclined in the same direction.

3. A shaft collar including two like arcuate sections, each section having on its inner edge at one end a dove-tail recess defining one edge of a beveled faced inwardly extending radially disposed lug and having on its outer edge a recess defining one edge of a dove-tail outwardly projecting radial tongue, the tongue and lug of one section interlocking with the tongue and lug of the other section.

In testimony whereof I hereunto affix my signature in the presence of two witnesses.

CHRISTOPHER F. X STARLIPER.
his mark

Witnesses:
M. CARLISLE LYDDAUE,
D. W. GALL.